(12) United States Patent
Jetten et al.

(10) Patent No.: US 7,920,768 B2
(45) Date of Patent: Apr. 5, 2011

(54) SINGLE MODE OPTICAL FIBER AS WELL AS OPTICAL COMMUNICATION SYSTEM

(75) Inventors: Mark Peter Marie Jetten, Weert (NL); Pieter Matthijsse, Hapert (NL)

(73) Assignee: Draka Comteq, B.V., Amsterdam (NL)

(*) Notice: Subject to any disclaimer, the term of this patent is extended or adjusted under 35 U.S.C. 154(b) by 0 days.

(21) Appl. No.: 12/788,581

(22) Filed: May 27, 2010

(65) Prior Publication Data
US 2010/0232755 A1    Sep. 16, 2010

Related U.S. Application Data

(62) Division of application No. 11/431,587, filed on May 11, 2005, now Pat. No. 7,734,136, which is a division of application No. 10/455,429, filed on Jun. 6, 2003, now Pat. No. 7,072,551.

(30) Foreign Application Priority Data

Jun. 6, 2002 (NL) .................................... 1020780

(51) Int. Cl.
*G02B 6/036* (2006.01)
(52) U.S. Cl. ........ 385/126; 385/122; 385/123; 385/124; 385/125; 385/127; 385/128
(58) Field of Classification Search ........... 385/122–128
See application file for complete search history.

(56) References Cited

U.S. PATENT DOCUMENTS

| | | | |
|---|---|---|---|
| 4,822,399 A | 4/1989 | Kanamori et al. | |
| 5,613,027 A | 3/1997 | Bhagavatula | |
| 5,649,044 A | 7/1997 | Bhagavatula | |
| 5,721,800 A | 2/1998 | Kato et al. | |
| 5,822,488 A | 10/1998 | Terasawa et al. | |
| 5,852,701 A | 12/1998 | Kato et al. | |
| 5,905,838 A | 5/1999 | Judy et al. | |
| 5,940,567 A | 8/1999 | Garito | |
| 6,396,987 B1 * | 5/2002 | de Montmorillon et al. | 385/123 |
| 6,591,050 B2 | 7/2003 | Fleury et al. | |
| 6,628,873 B1 | 9/2003 | Sillard et al. | |
| 6,633,714 B2 | 10/2003 | de Montmorillon et al. | |
| 6,819,850 B2 | 11/2004 | de Montmorillon et al. | |

(Continued)

FOREIGN PATENT DOCUMENTS
EP    0249230 A1    12/1987
(Continued)

OTHER PUBLICATIONS

European Search Report in counterpart European Application No. 03076746, dated Nov. 11, 2003.

(Continued)

*Primary Examiner* — Brian M. Healy
*Assistant Examiner* — Guy G Anderson
(74) *Attorney, Agent, or Firm* — Summa, Additon & Ashe, P.A.

(57) ABSTRACT

The present invention relates to a single mode optical fiber comprising a first central region having a radius r1, a maximum refractive index value n1 and at least one second ring surrounding said first central region, which second ring has a radius r2 and a minimum refractive index value n2, wherein n2<n1. The present invention furthermore relates to an optical communication system for multi-channel signal transmission.

20 Claims, 2 Drawing Sheets

U.S. PATENT DOCUMENTS

Figure 1:
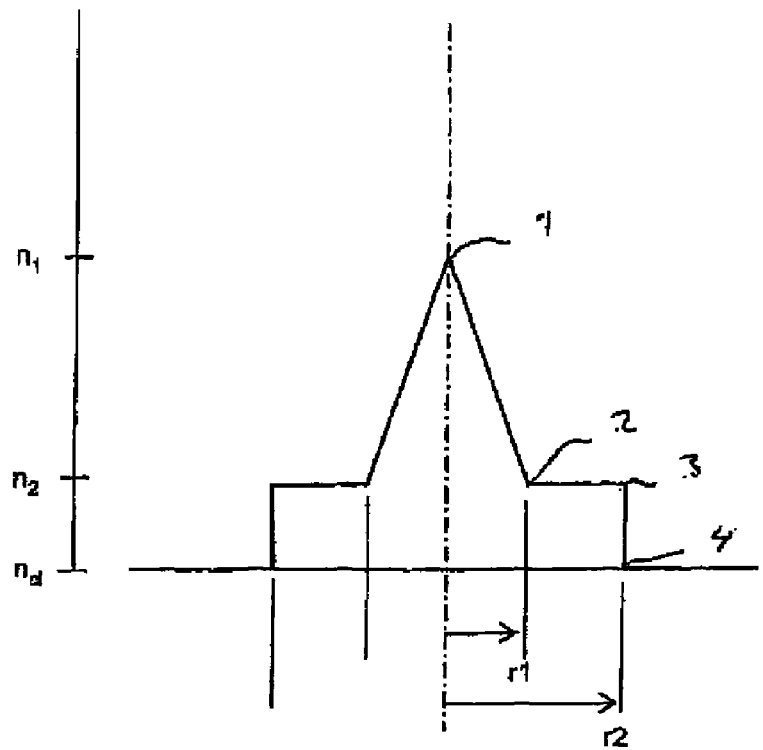

| | | |
|---|---|---|
| 6,895,153 B2 | 5/2005 | de Montmorillon et al. |
| 6,928,222 B2 | 8/2005 | Sillard et al. |
| 7,072,551 B1 | 7/2006 | Jetten et al. |
| 7,095,932 B2 | 8/2006 | Sillard et al. |
| 2007/0041688 A1 | 2/2007 | Jetten et al. |

FOREIGN PATENT DOCUMENTS

| | | |
|---|---|---|
| EP | 0775924 A2 | 5/1997 |
| EP | 0785448 A1 | 7/1997 |
| EP | 0789257 A1 | 8/1997 |
| EP | 1000909 A2 | 5/2000 |
| EP | 1369717 B1 | 8/2006 |

OTHER PUBLICATIONS

European Office Action in counterpart European Application No. 03076746, dated Jul. 21, 2004.

English translation of Chinese Office Action in counterpart Chinese Application No. 031454771, dated Aug. 11, 2006.

European Decision to grant a European patent in counterpart European Application No. 03076746, dated Jul. 6, 2006.

Nouchi, P., "Maximum Effective Area for Non-Zero Dispersion-Shifted Fiber," OFC '98 Technical Digest, Optical Fiber Communication Conference and Exhibit, vol. 2, XP-000961588, pp. 303-304, (1998) [cited in specification].

* cited by examiner

SINGLE MODE OPTICAL FIBER AS WELL AS OPTICAL COMMUNICATION SYSTEM

CROSS-REFERENCE TO PRIORITY APPLICATIONS

This application is a division of commonly assigned U.S. patent application Ser. No. 11/431,587 for a Single Mode Optical Fibre as well as Optical Communication System (filed May 11, 2006, and published Feb. 22, 2007, as U.S. Patent Application Publication No. 2007/0041688 A1).

Parent U.S. application Ser. No. 11/431,587 is a division of U.S. patent application Ser. No. 10/455,429 for a Single Mode Optical Fibre as well as Optical Communication System (filed Jun. 6, 2003, and published Jun. 29, 2006, as U.S. Patent Application Publication No. 2006/0140561 A1), now U.S. Pat. No. 7,072,551, which itself claims the benefit of Dutch Application No. 1,020,780 (filed Jun. 6, 2002, at the Dutch Patent Office).

Each of the foregoing patent applications, patent application publications, and patent is hereby incorporated by reference in its entirety.

FIELD OF THE INVENTION

The present invention relates to a single mode optical fiber comprising a first central region having a radius r1, a maximum refractive index value n1 and at least one second ring surrounding said first central region, which second ring has a radius r2 and a minimum refractive index value n2, wherein n2<n1.

BACKGROUND

Such a single mode optical fiber is known per se from U.S. Pat. No. 5,905,838, wherein in particular FIG. 4 schematically shows the normalized refractive index difference as a function of radial position for the four region fiber. Thus, the silica core doped with germanium is surrounded by an annular region of depressed index, in this instance, composed of fluorine-doped silica. Surrounding the region is a germano-silica ring, in turn within an outer cladding region of, for example, undoped silica. The core region shows a depressed-index dip characteristic of MCVD produced fiber. Such a fiber is also defined as a so-called "double window WDM ("wavelength division multiplexed") fiber," which fiber is used in so-called metro networks or long-distance networks. Such networks are characterized by medium-length transmission distances of up to a few hundred kilometers and a large number of nodes, where branches and/or connections to other (parts of) networks are present. The optical fibers via which the transmission of signals takes place in such networks are preferably suitable for high transmission rates at a large number of different wavelengths.

The article "Maximum effective area for non-zero dispersion-shifted fibre," discloses refractive index profiles in which a fiber of this type has a dispersion slope of 0.08 ps/(nm²·km) at 1550 nm. The effective area at 1550 nm is in the 45-110 μm² range. Further details with regard to the slope for obtaining a satisfactory equilibrium of characteristics, in particular as regards the dispersion slope, macro bending and effective area, are not known therefrom.

U.S. Pat. No. 6,396,987 relates to an optical fiber for use in WDM transmission systems, wherein the effective area is larger than or equal to 60 μm² and the dispersion value ranges from 6 to 10 ps/(nm·km).

European patent application No. 0249230, relates to a method for manufacturing a preform. Since said document only relates to preforms, no specific details are provided with regard to the optical fiber drawn from such a preform, such as the value of the dispersion slope, the dispersion value or the effective area.

European patent application No. 0775924, relates to a single mode optical fiber having a three-segment index profile. Although the zero dispersion wavelength is in the 1520-1600 nm range, the total dispersion slope may be ≦0.095 ps/(nm²·km). No details are provided with regard to the slope required for obtaining a satisfactory equilibrium of characteristics as regards the dispersion slope, macro bending and effective area.

In the case of very long distances (distances of 1000 km and longer) optical fibers for high transmission rates are optimized for use in wavelength range around 1550 nm, in which wavelength range the optical attenuation may be considered low (about 0.2 dB/km). The NZDF ("non-zero dispersion fibers") also have shifted dispersion, as a result of which the dispersion at a wavelength of 1550 nm is lower than that of a standard single mode fiber. The dispersion value deviates sufficiently from zero, however, for minimizing the effect of non-linear characteristics that may have a seriously adverse effect on the allowable maximum transmission capacity.

Because of the relatively short distances in the aforesaid networks, less strict requirements are made of the optical attenuation, as a result of which also the wavelength range around 1300 nm, which has a characteristic attenuation of about 0.3 dB/km, is in principle suitable for such applications. As a result of the optimization thereof in the 1550 nm wavelength range, the fibers used for long-distance transmission are less suitable for use in the wavelength range around 1300 nm, however.

SUMMARY AND DETAILED DESCRIPTION

It is an object of the present invention to provide a single mode optical fiber suitable for multichannel transmission in the wavelength range around 1550 nm, viz. 1440 nm-1625 nm, and the wavelength range around 1300 nm, viz. 1250 nm-1360 nm, using high transmission rates.

Another object of the present invention is to provide a single mode optical fiber in which the profile of the optical fiber is designed to prevent stress variations that may lead to undesirable characteristics of the optical fiber.

The single mode optical fiber as referred to in the introduction is according to the present invention characterized in that the refractive index value n1 is substantially constant in the first central region having radius r1, and in the second ring having radius r2 the refractive index value decreases in radial direction from n1 to n2 over a distance r1–r2, with the decrease, which is substantially linear, taking place in accordance with the following equation:

$$\text{slope} = (D1 - D2)/(r2 - r1), \text{ where}$$

$$0.11 < \text{slope} < 0.22, \text{ and}$$

$$D_i = \frac{n_i^2 - n_{Cl}^2}{2 \cdot n_i^2} \cdot 100\% \text{ and } n_i > n_{Cl}$$

$D_i$=refractive index contrast for position i,
$n_i$=refractive index of position i,
$n_{cl}$=refractive index of the outer fiber cladding.

In a special embodiment the central region, which has a substantially constant refractive index, preferably has a radius r1 having a maximum value of 0.25 μm. If the radius r1 is larger than the aforesaid value, it is not possible to obtain a fiber having a sufficiently large effective area and a sufficiently low dispersion slope.

The present invention furthermore relates to a single mode optical fiber comprising a first central region having a radius r1 and a maximum refractive index value n1 and at least one second ring surrounding said first central region, which second ring has a radius r2 and a minimum refractive index value n2, where n2<n1, which fiber is characterized in that the refractive index value is substantially constant in the second ring and decreases in radial direction over a distance r1 from n1 to n2 from the central axis of symmetry in the first central region, with the decrease, which is substantially linear, taking place in accordance with the following equation:

$$\text{slope} = (D1 - D2)/(r1), \text{ where}$$

$$0.11 < \text{slope} < 0.22, \text{ and}$$

$$D_i = \frac{n_i^2 - n_{Cl}^2}{2 \cdot n_i^2} \cdot 100\%, \text{ and}$$

$$n_i > n_{Cl},$$

wherein the meaning of $D_i$, $n_i$ and $n_{cl}$ is as indicated above.

The present invention furthermore relates to a single mode optical fiber comprising a first central region having a radius r1 and a maximum refractive index value n1 and at least one second ring surrounding said first central region, which second ring has a radius r2 and a minimum refractive index value n2, where n2<n1, which single mode fiber is characterized in that the refractive index value is substantially constant in the second ring and decreases in radial direction over a distance r1 from n1 to n1″ from the central axis of symmetry in the first central region, with the decrease, which is substantially linear, taking place in accordance with the following equation:

$$\text{slope} = (D1 - D1'')/(r1), \text{ where}$$

$$0.11 < \text{slope} < 0.22, \text{ and}$$

$$D_i = \frac{n_i^2 - n_{Cl}^2}{2 \cdot n_i^2} \cdot 100\%, \text{ and } n_i > n_{Cl} \text{ and } n1 > n1'' > n2,$$

wherein the meaning of $D_i$, $n_i$ and $n_{cl}$ is as indicated above.

The present inventors have accomplished their invention on basis of this finding, with the profile of the optical fiber being so designed as to prevent undesirable stress variations. Undesirable characteristics, such as an increased PMD (or sensitivity to the hydrogen-induced attenuation losses) are thus reduced to a minimum.

In specific embodiments, the second ring having radius r2 is preferably surrounded by a third ring having a radius r3 and a refractive index value n3, wherein n3<n2 and r3>r2. In addition, the third ring having radius r3 may be surrounded by a fourth ring having a radius r4 and a refractive index value n4, wherein n4<n3 and r4>r3.

Preferably, the dispersion value of the present optical fiber is 8 ps/(nm·km) or higher at 1550 nm, whereas the dispersion value at 1300 nm must be −8 ps/(nm·km) or lower. When such dispersion values are used, it is possible to use several channels, viz. signals having different wavelengths, simultaneously in the two aforesaid wavelength ranges at high transmission rates of 10 Gbit/s or higher, without the non-linear characteristics having a limiting effect in this regard.

The present inventors have furthermore discovered that the slope in the refractive index profile is an important design parameter for achieving the right combination of characteristics of the final optical fiber. Consequently, said slope preferably ranges from 0.11 to 0.22, in particular from 0.13 to 0.19. If a slope having a value higher than the above range of values is used, the macro bending losses and the dispersion slope will be too large, which is undesirable in practice. If, on the other hand, a slope having a value lower than the above range of values is used, the effective area will be too small, which is also undesirable in practice.

In order to enable the simultaneous transmission of a large number of signals at different wavelengths without significantly limiting the power density, the present optical fiber preferably has an effective area of 60 μm² or more at a wavelength in the 1550 nm range.

Furthermore preferably, the dispersion slope for the present optical fiber ranges from 0.07 to 0.095 ps/(nm²·km) at 1550 nm.

In order to ensure that the present optical fiber can be considered to be a single mode optical fiber over a maximum wavelength range, the cut-off wavelength is preferably lower than 1200 nm, measured for an optical fiber having a length of 2 m.

In addition to having the features of the aforesaid preferred embodiments, the optical fiber should exhibit low losses caused by bending of the optical fiber. The fact is that many connections are made in the aforesaid networks consisting of optical fibers, for which connections loops are usually laid in the fiber at the locations of said connections. Thus, it is desirable to limit the attenuation losses caused by such loops as much as possible, which preferably implies that the macro bending losses, measured at a wavelength of 1625 nm and 100 windings having a bending diameter of 60 mm, are preferably lower than 0.05 dB.

The present invention furthermore relates to an optical communication system for multi-channel signal transmission, which system is characterized in that the present fiber is used as a transmission medium for several channels in the wavelength range of either 1550 nm or 1300 nm.

The present invention will be explained in more detail hereinafter by means of embodiments, in which connection it should be noted, however, that the present invention is by no means limited to such embodiments. In the appended FIGS. 1-3, the refractive index profiles of a number of optical fibers according to a special embodiment of the invention are schematically shown as a function of the radius.

FIG. 1 shows a possible refractive index profile of a fiber according to the present invention. The position indicated at reference number 1 on said profile is a maximum refractive index substantially on the axis of symmetry, which position has a refractive index value n1 and a refractive index difference D1. The position indicated at reference number 2 is spaced from the axis of symmetry by a distance r1 and has a distinctly lower refractive index value n2 and refractive index difference D2 than the position indicated at reference number 1. The refractive index value decreases in practically linear, monotonous fashion from position 1 to position 2, with the slope h being in accordance with the following equation: h=(D1−D2)/(r1). The position indicated at 3 is spaced from the axis of symmetry by a distance r2. Finally, numeral 4 indicates a position which is spaced from the axis of symmetry by substantially the same distance as position 3, which position 4 shows the refractive index value of the cladding, which cladding extends from the axis of symmetry starting on a distance r2 and has a refractive index value lower than that of position 3.

Figure 2:
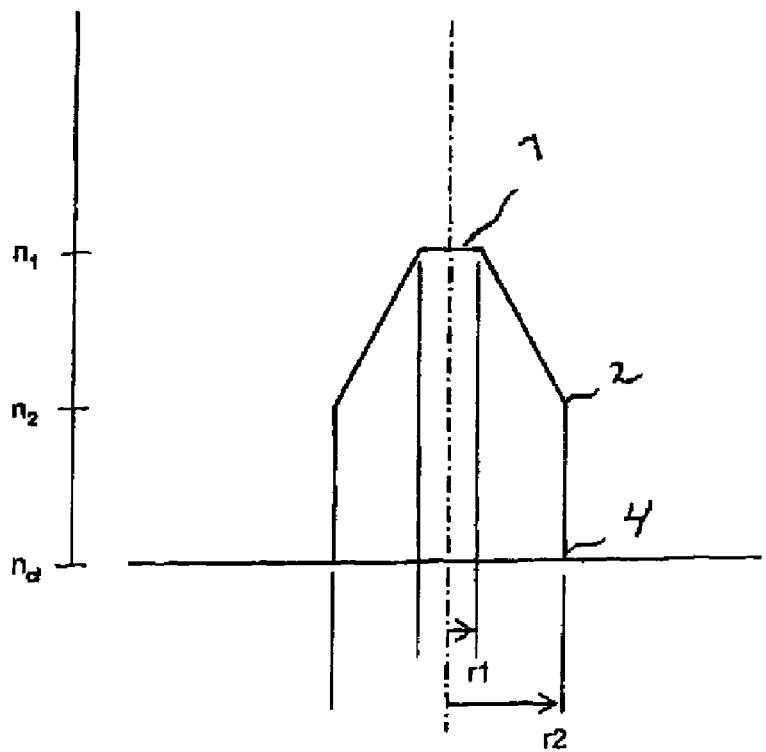

FIG. 2 shows a refractive index profile of a fiber according to the present invention. A circularly symmetric profile having a distance r1 is built up around a central axis of symmetry, in which the position indicated at reference number 1 of said profile requires a refractive index having a constant refractive index value n1. The position indicated at reference number 2 is spaced from the axis of symmetry by a distance r2 and has a distinctly lower refractive index value n2 and refractive index difference D2 than the position indicated at reference number 1. The refractive index value decreases in practically linear, monotonous fashion from position 1 to position 2, where the slope h=(D1−D2)/(r1). The position indicated at reference number 4 indicates the refractive index value of the cladding, which cladding extends from the axis of symmetry starting on a distance r2. In FIG. 2, n1>n2>ncl.

Figure 3:
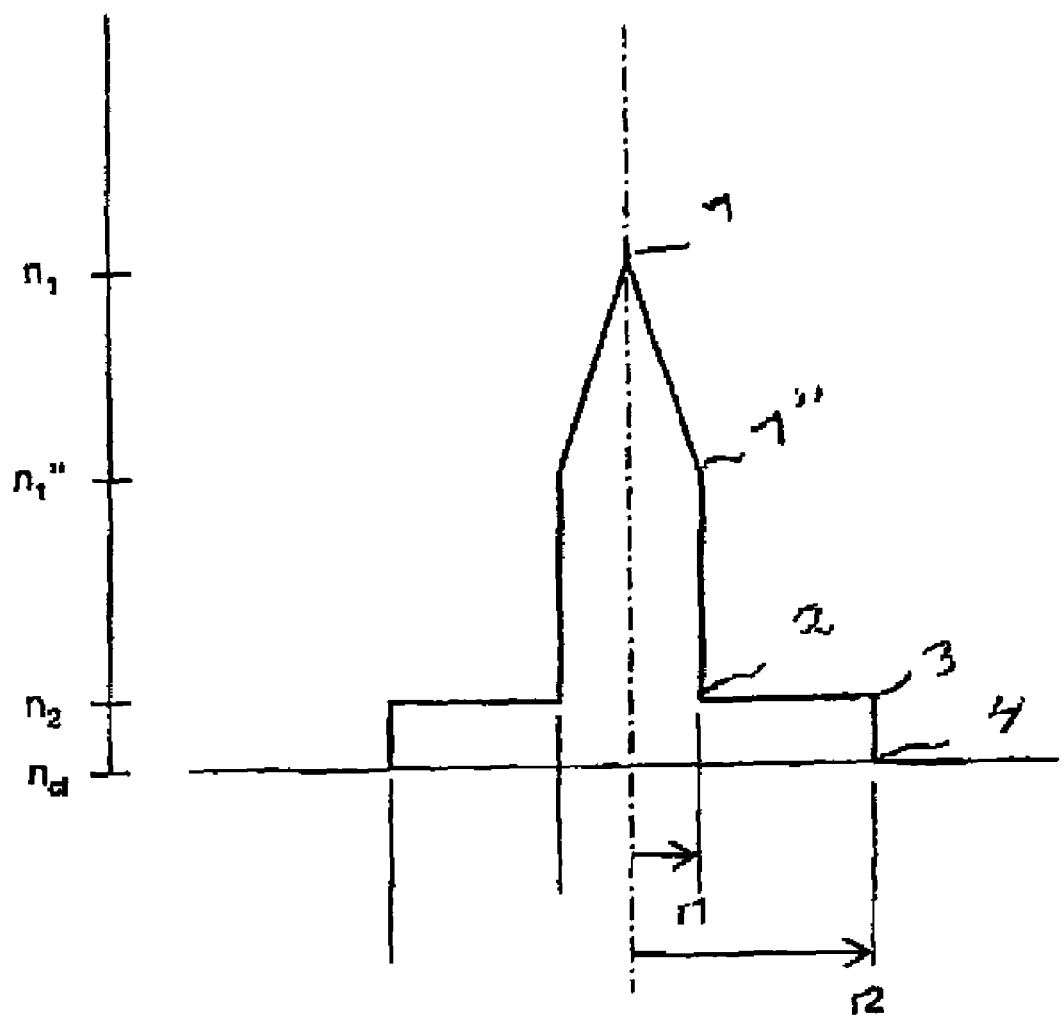

FIG. 3 shows a refractive index profile of a fiber according to the present invention. The position indicated at 1 on said profile is a maximum refractive index substantially on the axis of symmetry, which position has a refractive index value n1 and a refractive index difference D1. The position indicated at 1″ is spaced from the axis of symmetry by a distance r1 and has a distinctly lower refractive index value n1″ than the position indicated at 1. The refractive index value decreases in practically linear, monotonous fashion from position 1 to position 1″ already. The position indicated at 2 is also spaced from the axis of symmetry by a distance r2 and has a refractive index value n2 and a refractive index difference D2. Finally, reference number 4 indicates a position which is spaced from the axis of symmetry by substantially the same distance as position 3, from which position 4 the cladding begins, which cladding has a refractive index value lower than that of position 3.

As already explained before, the slope h is an important design parameter for obtaining the right combination of characteristics of the optical fiber. Said slope h can be influenced by, for example, adapting the refractive index difference of position 2. The slope can be increased by causing the index value of position 2, in particular in FIGS. 1 and 2, to decrease. In addition to that, adaptation of the slope can also take place by changing the radial position of position 1″ (see FIG. 3) and position 2 (see FIGS. 1 and 2). As already said before, the present inventors have discovered that the slope preferably ranges from 0.11 to 0.22, more in particular from 0.13 to 0.19. In the case of a slope having a value higher than the aforesaid range of values the macro bending losses will increase undesirably, whilst the result of a slope having a value lower than the aforesaid range of values will be that the desired effective area will be too small.

The influence of the slope in the refractive index profile of the profiles presented herein on a number of parameters, viz. the dispersion slope, which is preferably lower than 0.095 ps/(nm²·km), the macro bending losses, which are preferably lower than 0.05 dB (measured at a wavelength of 1625 nm, windings having a bending diameter of 60 mm) and an effective area, which is preferably larger than 60 μm², has been investigated for optical fibers that meet the dispersion requirement of ≧8 ps/(nm·km) at 1550 nm and ≦−8 ps/(nm·km) at 1300 nm and the cut-off wavelength requirement of <1200 m, measured on an optical fiber having a length of 2 m. The results are presented in the table below.

TABLE I

| Slope | Dispersion slope | Macro bending | Effective area |
|---|---|---|---|
| 0.10 | ++ | ++ | − |
| 0.12 | + | ++ | +/− |
| 0.14 | + | + | + |
| 0.16 | + | + | + |
| 0.18 | + | + | + |
| 0.20 | +/− | + | + |
| 0.22 | +/− | +/− | ++ |
| 0.24 | +/− | −− | ++ |

The above table clearly shows that a satisfactory equilibrium of characteristics is obtained with a slope in the range 0.11<slope<0.22.

The invention claimed is:
1. A single mode optical fiber, comprising:
a first central region defining a radius r1, said first central region having a maximum refractive index value $n1_{max}$ and a minimum refractive index value $n1_{min}$; and
a second ring surrounding said first central region, wherein said second ring has a substantially constant refractive index value n2 that is less than the minimum refractive index value $n1_{min}$ of said first central region;
wherein the refractive index value of said first central region decreases from the central axis of symmetry in said first central region in a radial direction over a distance equal to the radius r1, the refractive index value decreasing from $n1_{max}$ to $n1_{min}$ in a substantially linear fashion, whereby said first central region is substantially free of a portion having a constant refractive index value, and wherein the decrease takes place in accordance with the following equation:

$$\text{slope} = (D1_{max} - D1_{min})/(r1), \text{ wherein}$$

$$0.11 < \text{slope} < 0.22,$$

$$D_i = \frac{n_i^2 - n_{Cl}^2}{2 \cdot n_i^2} \cdot 100\% \text{ and } n_i > n_{Cl},$$

and wherein
$D_i$=refractive index contrast for position i,
$n_i$=refractive index value of position i, and
$n_{cl}$=refractive index value of an outer fiber cladding.
2. An optical fiber according to claim 1, comprising a third ring surrounding said second ring, said third ring defining a radius r3 and having a refractive index value n3, wherein n3<n2 and r3>r2.
3. An optical fiber according to claim 2, comprising a fourth ring surrounding said third ring, said fourth ring defining a radius r4 and having a refractive index value n4, wherein n4<n3 and r4>r3.
4. An optical fiber according to claim 1, wherein 0.13<slope<0.19.
5. An optical fiber according to claim 1, wherein the optical fiber has a dispersion slope of between about 0.07 ps/(nm²·km) and 0.095 ps/(nm²·km) at 1550 nm.
6. An optical fiber according to claim 1, wherein the optical fiber has a dispersion value of about 8 ps/(nm·km) or higher at 1550 nm.
7. An optical fiber according to claim 1, wherein the optical fiber has a dispersion value of about −8 ps/(nm·km) or lower at 1300 nm.
8. An optical fiber according to claim 1, wherein the optical fiber has an effective area of about 60 μm² or more at 1550 nm.

9. An optical fiber according to claim 1, wherein the optical fiber has a cut-off wavelength lower than 1200 nm, measured for a fiber length of 2 meters.

10. An optical fiber according to claim 1, wherein said first central region defines a radius r1 of no more than about 0.25 µm.

11. An optical fiber according to claim 1, wherein the optical fiber has attenuation losses of no more than about 0.05 dB, measured at a wavelength of 1625 nm and using 100 windings having a bending diameter of about 60 mm.

12. An optical communication system for multi-channel signal transmission comprising an optical fiber according to claim 1.

13. A single mode optical fiber, comprising:
   a first central region defining a radius r1, said first central region having a maximum refractive index value $n1_{max}$ and a minimum refractive index value $n1_{min}$; and
   a second ring surrounding said first central region, wherein said second ring has a substantially constant refractive index value n2 that is less than the minimum refractive index value $n1_{min}$ of said first central region;
   wherein the refractive index value of said first central region decreases from the central axis of symmetry in said first central region in a radial direction over a distance equal to the radius r1, the refractive index value decreasing from $n1_{max}$ to $n1_{min}$ in a substantially linear fashion, whereby said first central region is substantially free of a portion having a constant refractive index value, and wherein the decrease takes place in accordance with the following equation:

$$\text{slope} = (D1_{max} - D1_{min})/(r1), \text{ wherein}$$
$$0.13 < \text{slope} < 0.19,$$

-continued
$$D_i = \frac{n_i^2 - n_{Cl}^2}{2 \cdot n_i^2} \cdot 100\% \text{ and } n_i > n_{CL}$$

and wherein
$D_i$=refractive index contrast for position i,
$n_i$=refractive index value of position i, and
$n_{Cl}$=refractive index value of an outer fiber cladding; and
wherein the optical fiber has a dispersion slope of between about 0.07 ps/(nm²·km) and 0.095 ps/(nm²·km) at 1550 nm.

14. An optical fiber according to claim 13, comprising a third ring surrounding said second ring, said third ring defining a radius r3 and having a refractive index value n3, wherein n3<n2 and r3>r2.

15. An optical fiber according to claim 14, comprising a fourth ring surrounding said third ring, said fourth ring defining a radius r4 and having a refractive index value n4, wherein n4<n3 and r4>r3.

16. An optical fiber according to claim 13, wherein the optical fiber has a dispersion value of about 8 ps/(nm·km) or higher at 1550 nm.

17. An optical fiber according to claim 13, wherein the optical fiber has a dispersion value of about −8 ps/(nm·km) or lower at 1300 nm.

18. An optical fiber according to claim 13, wherein the optical fiber has an effective area of about 60 µm² or more at 1550 nm.

19. An optical fiber according to claim 13, wherein the optical fiber has a cut-off wavelength lower than 1200 nm, measured for a fiber length of 2 meters.

20. An optical fiber according to claim 13, wherein the optical fiber has attenuation losses of no more than about 0.05 dB, measured at a wavelength of 1625 nm and using 100 windings having a bending diameter of about 60 mm.

* * * * *